(No Model.) 3 Sheets—Sheet 1.
N. TESLA.
SYSTEM OF ELECTRICAL TRANSMISSION OF POWER.
No. 487,796. Patented Dec. 13, 1892.
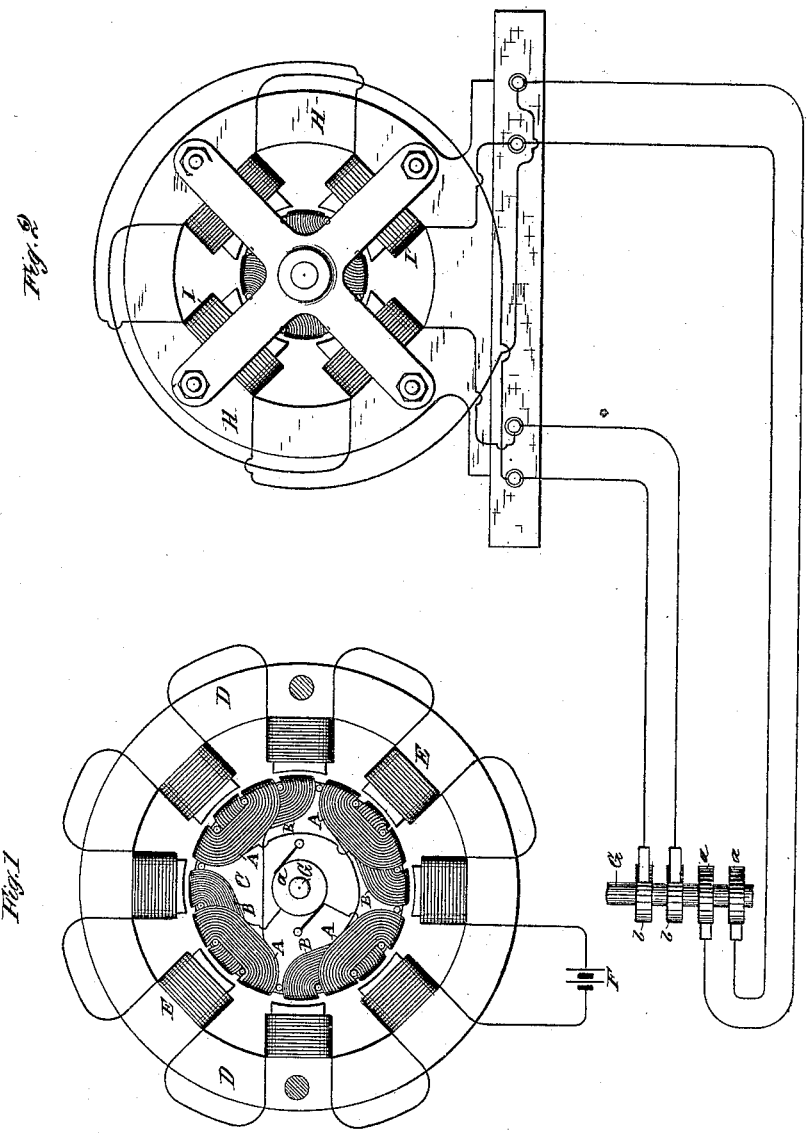

(No Model.) 3 Sheets—Sheet 2.
N. TESLA.
SYSTEM OF ELECTRICAL TRANSMISSION OF POWER.
No. 487,796. Patented Dec. 13, 1892.
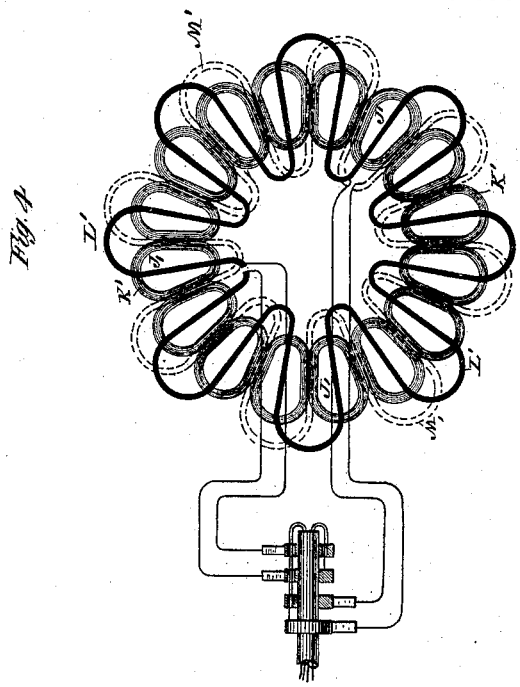
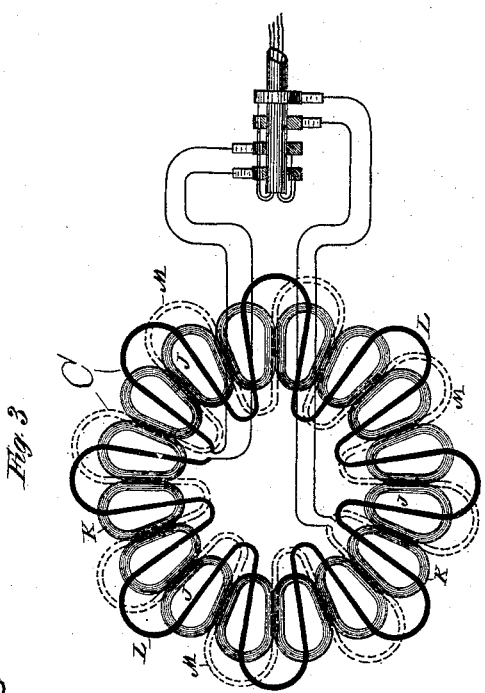
WITNESSES:
Raphaël Netter
Allan W. Paige
INVENTOR
Nikola Tesla
BY
Duncan, Curtis & Page
ATTORNEYS.

(No Model.) 3 Sheets—Sheet 3.
N. TESLA.
SYSTEM OF ELECTRICAL TRANSMISSION OF POWER.
No. 487,796. Patented Dec. 13, 1892.
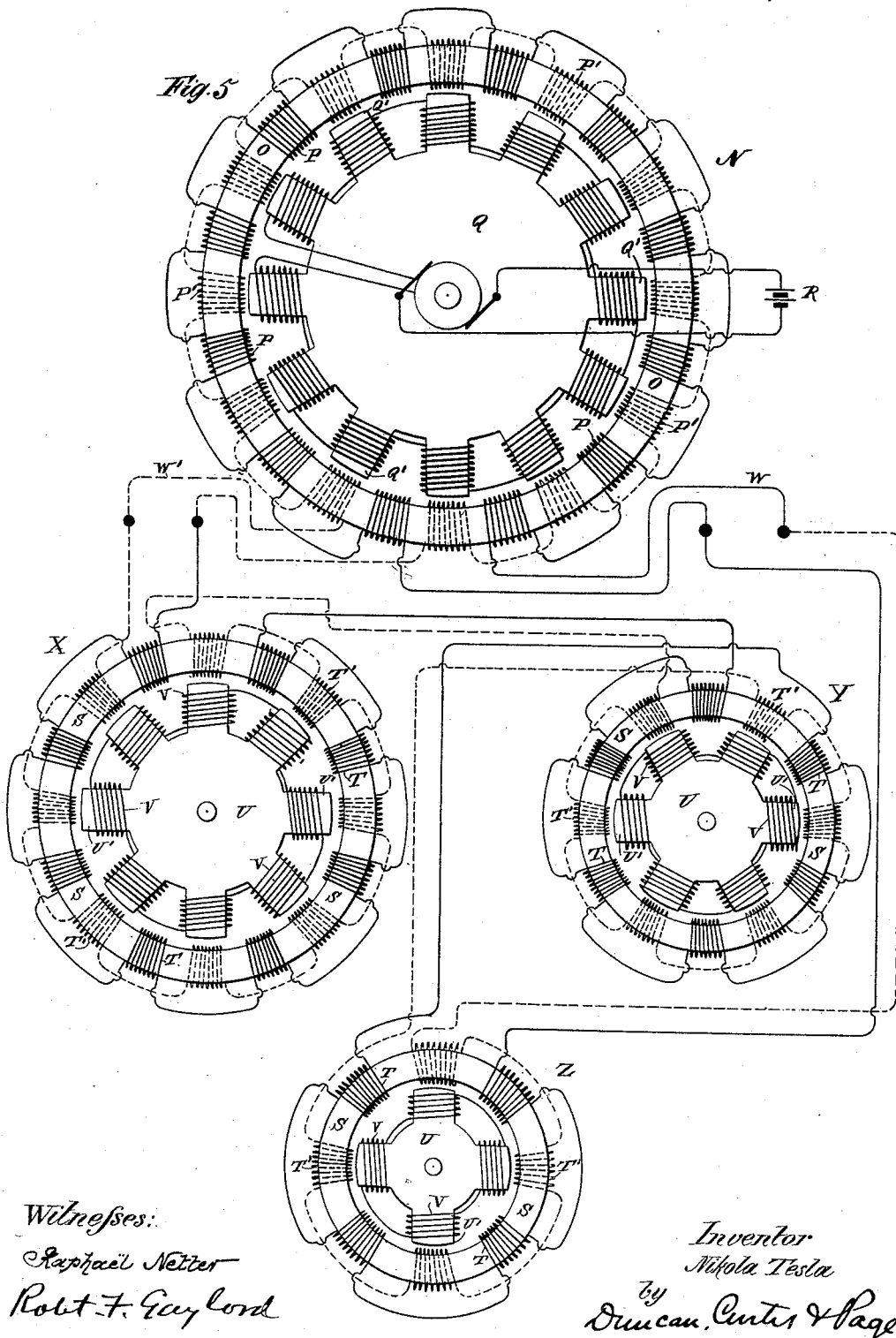
Witnesses:
Raphaël Netter
Robt. F. Gaylord
Inventor
Nikola Tesla
by Duncan, Curtis & Page
Attorneys.

UNITED STATES PATENT OFFICE.

NIKOLA TESLA, OF NEW YORK, N. Y., ASSIGNOR TO THE TESLA ELECTRIC COMPANY, OF SAME PLACE.

SYSTEM OF ELECTRICAL TRANSMISSION OF POWER.

SPECIFICATION forming part of Letters Patent No. 487,796, dated December 13, 1892.

Application filed May 15, 1888. Serial No. 273,992. (No model.)

*To all whom it may concern:*

Be it known that I, NIKOLA TESLA, a subject of the Emperor of Austria-Hungary, formerly of Smiljan, Lika, border country of Austria-Hungary, but now residing at New York, in the county and State of New York, have invented certain new and useful Improvements in Systems for the Electrical Transmission of Power, of which the following is a specification, reference being had to the drawings accompanying and forming a part of the same.

This invention is an improvement in systems of electrical distribution of power wherein are employed motors having two or more independent energizing-circuits, through which are passed alternating currents differing in phase that are produced by a magneto-electric machine having independent induced circuits, or that are obtained from any other suitable source or by any other suitable means. In illustration of the various conditions which I regard as most important to an attainment of the best results from the use of motors of this character, I have heretofore used generally forms of generator in which the relations of the induced or current-generating coils and field-magnets were such that but two impulses or current are produced in each coil by a single revolution of the armature or field cores. The rate, therefore, at which the different phases or impulses of current in the line-circuits succeeded one another was so little greater than that at which the armature of the generator revolved that without special provision the generator required to be run at very high speed to obtain the best results. It is well known that the most efficient results are secured in the operation of such motors when they are run at high speeds; but as the practicable rate of speed is much limited by mechanical conditions, particularly in the case of large generators, which would be required when a number of motors are run from a single source, I have sought to produce a greater number of current impulses by a slow or slower speed than that at which the ordinary bipolar machines may be economically operated. I therefore adapt to my system any of the various types of multipolar alternating-current machines which yield a considerable number of current reversals or impulses for each revolution of the armature by observing the main condition essential to the operation of my system that the phases of the currents in the independent induced circuits of the generator should not coincide, but exhibit a sufficient difference in phase to produce the desired results. I may accomplish this in a variety of ways, which, however, vary only in detail, since they are based upon the same underlying principle. For example, to adapt a given type of alternating-current generator I may couple rigidly two complete machines, securing them so that the requisite difference in phase between the currents produced by each will be obtained, or I may secure two armatures to the same shaft within the influence of the same field and with an angular displacement that will produce the proper difference in phase between the two currents, or I may secure two armatures to the same shaft with their coils symmetrically disposed, and place two sets of field-magnets at such angle as to secure the same result, or, finally, I may wind on the same armature the two sets of coils alternately, or in such manner that they will develop currents, the phases of which differ in time sufficiently to produce rotation of the motor.

Another feature of my invention is in the plan which I have devised for utilizing generators and motors of this type, whereby a single generator may be caused to run a number of motors either at the same speed as its own or all at different speeds. This I accomplish by constructing the motors with fewer poles than the generator, in which case their speed will be greater than that of the generator, the rate of speed being higher as the number of their poles is relatively less. This will be understood from an example. Suppose the generator has two independent generating-coils which revolve between two pole-pieces oppositely magnetized and that the motor has energizing-coils that produce at any given time two magnetic poles in one element that tend to set up a rotation of the motor. A generator thus constructed yields four impulses or reversals of current by each revolution, two in each of its independent circuits, and I have demonstrated that the effect upon a motor such as that mentioned is to shift the magnetic poles through three hundred and sixty degrees. It is obvious that if the four reversals in the same order could be produced by each half-revolution of the generator the motor would make two revolutions to the generator's one. This would be readily accomplished by adding two intermediate poles to the generator or altering it in any of the other equivalent ways above indicated. The same rule applies to generators and motors with multiple poles. For instance, if a generator be constructed with two circuits, each of which produces twelve reversals of current to a revolution, and these currents be directed through the independent energizing-coils of a motor, the coils of which are so applied as to produce twelve magnetic poles at all times, the rotation of the two will be synchronous; but if the motor-coils produce but six poles the movable element will be rotated twice while the generator rotates once, or if the motor have four poles its rotation will be three times as fast as that of the generator.

These features, so far as it is necessary to an understanding of the invention, are illustrated in the accompanying drawings.

Figure 1 is a diagrammatic illustration of a generator constructed in accordance with my invention. Fig. 2 is a similar view of a correspondingly-constructed motor. Fig. 3 is a diagram of a generator of modified construction. Fig. 4 is a diagram of a motor of corresponding character. Fig. 5 is a diagram of a system containing a generator and several motors adapted to run at various speeds.

In Fig. 1, let C represent a cylindrical armature-core wound longitudinally with insulated coils A A, which are connected up in series, the terminals of the series being connected to collecting-rings $a$ $a$ on the shaft G. By means of this shaft the armature is mounted to rotate between the poles of an annular field-magnet D, formed with polar projections wound with coils E, that magnetize the said projections. The coils E are included in the circuit of a generator F, by means of which the field-magnet is energized. If thus constructed, the machine is a well-known form of alternating-current generator. To adapt it to my system, however, I wind on armature C a second set of coils B B intermediate to the first, or, in other words, in such positions that while the coils of one set are in the relative positions to the poles of the field-magnet to produce the maximum current those of the other set will be in the position in which they produce the minimum current. The coils B are connected, also, in series and to two collecting-rings $b$ $b$, secured generally to the shaft at the opposite end of the armature.

The motor shown in Fig. 2 has an annular field-magnet H, with four pole-pieces wound with coils I. The armature is constructed similarly to that of the generator, but with two sets of two coils in closed circuits to correspond with the reduced number of magnetic poles in the field.

From the foregoing it is evident that one revolution of the armature of the generator producing eight current impulses in each circuit will produce two revolutions of the motor-armature.

The application of the principle of this invention is not confined to any particular form of machine. In Figs. 3 and 4 a generator and motor of another well-known type are shown. In Fig. 3, J J are magnets disposed in a circle and wound with coils K, which are in circuit with a generator which supplies the current that maintains the field of force. In the usual construction of these machines the armature-conductor L is carried by a suitable frame, so as to be rotated in face of the magnets J J or between these magnets and another similar set in face of them. The magnets are energized so as to be of alternately-opposite polarity throughout the series, so that as the conductor C is rotated the current impulses combine or are added to one another, those produced by the conductor in any given position being all in the same direction. To adapt such a machine to my system, I add a second set of induced conductors M, in all respects similar to the first, but so placed with reference to it that the currents produced in each will differ by a quarter-phase. With such relations it is evident that as the current decreases in conductor L it increases in conductor M, and conversely, and that any of the forms of motor invented by me for use in this system may be operated by such generator.

Fig. 4 is intended to show a motor corresponding to the machine in Fig. 3. The construction of the motor is identical with that of the generator, and if coupled thereto it will run synchronously therewith. J' J' are the field-magnets, and K' the coils thereon. L' is one of the armature-conductors and M' the other.

Fig. 5 shows in diagram other forms of machine. The generator N in this case is shown as consisting of a stationary ring O, wound with twenty-four coils P P', alternate coils being connected in series in two circuits. Within this ring is a disk or drum Q, with projections Q' wound with energizing-coils included in circuit with a generator R. By driving this disk or cylinder alternating currents are produced in the coils P and P', which are carried off to run the several motors.

The motors are composed of a ring or annular field-magnet S, wound with two sets of energizing-coils T T', and armatures U, having projections U' wound with coils V, all connected in series in a closed circuit or each closed independently on itself.

Suppose the twelve generator-coils P are wound alternately in opposite directions, so that any two adjacent coils of the same set tend to produce a free pole in the ring O between them and the twelve coils P' to be similarly wound. A single revolution of the disk or cylinder Q, the twelve polar projections of which are of opposite polarity, will therefore produce twelve current impulses in each of the circuits W W'. Hence the motor X, which has sixteen coils or eight free poles, will make one and a half turns to the generator's one. The motor Y, with twelve coils or six poles, will rotate with twice the speed of the generator, and the motor Z, with eight coils or four poles, will revolve three times as fast as the generator. These multipolar motors have a peculiarity which may be often utilized to great advantage. For example, in the motor X, Fig. 5, the eight poles may be either alternately opposite or there may be at any given time alternately two like and two opposite poles. This is readily attained by making the proper electrical connections. The effect of such a change, however, would be the same as reducing the number of poles one-half, and thereby doubling the speed of any given motor. In these and other respects it will be seen that the invention involves many important and valuable features.

It is obvious that the electrical transformers described in prior patents to me and which have independent primary currents may be used with the generators herein described.

It may be stated with respect to the devices hereinafter set forth that the most perfect and harmonious action of the generators and motors is obtained when the numbers of the poles of each are even and not odd. If this is not the case, there will be a certain unevenness of action which is the less appreciable as the number of poles is greater; but even this may be in a measure corrected by special provisions which it is not here necessary to explain. It also follows, as a matter of course, and from the above it is obvious, that if the number of the poles of the motor be greater than that of the generator the motor will revolve at a slower speed than the generator.

What I claim as my invention is—

1. The combination, with an alternating-current generator comprising independent armature-circuits formed by conductors alternately disposed, so that the currents developed therein will differ in phase, and field-magnet poles in excess of the number of armature-circuits, of a motor having independent energizing-circuits connected to the armature-circuits of the generator, substantially as set forth.

2. The combination, with a source of alternating currents which differ in phase and comprising a rotating magneto-electric machine yielding a given number of current impulses or alternations for each turn or revolution, of a motor or motors having independent energizing-circuits through which the said currents are caused to flow, and poles which in number are less than the number of current impulses produced in each motor-circuit by one turn or revolution of the magneto-machine, as set forth.

3. The combination, with a multipolar alternating-current machine having independent induced or current-generating circuits, of motors having independent energizing-circuits and a smaller number of poles than the generator, as set forth.

4. The combination, with an alternating-current generator having independent induced circuits and constructed or adapted to produce a given number of current impulses or alternations for each turn or revolution, of motors having corresponding energizing-circuits and poles which in number are less than the number of current impulses produced in each circuit in a turn or revolution of the generator, as set forth.

NIKOLA TESLA.

Witnesses:
FRANK E. HARTLEY,
FRANK B. MURPHY.